United States Patent
Funken et al.

[11] Patent Number: 6,124,550
[45] Date of Patent: Sep. 26, 2000

[54] DEVICE FOR CONNECTING THE ELECTRICALLY CONDUCTING JACKET OF A LINE TO AN EARTH LEAD

[75] Inventors: Peter Funken, Frechen; Karl-Hans Heinen, Köln; Jürgen Vogt, Eiterfeld; Hermann V. Kuepach, Landshut; Friedrich Löser, Riemerling, all of Germany

[73] Assignees: Felton & Guillaume Kabelwerke GmbH; Thyssen-Transrapid System GmbH, both of Germany

[21] Appl. No.: 09/068,125

[22] PCT Filed: Oct. 16, 1996

[86] PCT No.: PCT/EP96/04495

§ 371 Date: Oct. 16, 1998

§ 102(e) Date: Oct. 16, 1998

[87] PCT Pub. No.: WO97/16881

PCT Pub. Date: May 9, 1997

[30] Foreign Application Priority Data

Oct. 30, 1995 [DE] Germany ............................ 195 40 442
May 20, 1996 [DE] Germany ............................ 196 20 222

[51] Int. Cl.[7] .................................................. H02G 15/02
[52] U.S. Cl. .......................... 174/78; 174/65 R; 310/68 R
[58] Field of Search ..................... 174/78, 35 R, 174/36, 51, 65 R; 310/12, 13, 14, 68 R, 71

[56] References Cited

U.S. PATENT DOCUMENTS

| 4,126,370 | 11/1978 | Nihman | 339/143 R |
| 4,228,372 | 10/1980 | Popov et al. | 310/13 |
| 4,314,168 | 2/1982 | Breitenbach | 310/13 |
| 4,498,546 | 2/1985 | Peterson | 174/35 R |
| 4,613,191 | 9/1986 | Papa | 339/14 R |
| 4,785,138 | 11/1988 | Breitenbach et al. | 174/106 SC |
| 5,036,165 | 7/1991 | Elton et al. | 174/102 SC |
| 5,281,762 | 1/1994 | Long et al. | 174/78 |
| 5,684,470 | 11/1997 | Deland et al. | 340/825 |
| 5,821,652 | 10/1998 | Hyypio | 310/83 |
| 5,850,056 | 12/1998 | Harwath | 174/40 |
| 5,889,340 | 3/1999 | Miller et al. | 310/12 |

FOREIGN PATENT DOCUMENTS

| 491 934 | 1/1977 | Austria . |
| 300382 A1 | 8/1981 | Germany . |
| 3309051 A1 | 9/1984 | Germany . |

*Primary Examiner*—Kristine Kincaid
*Assistant Examiner*—William H Mayo, III
*Attorney, Agent, or Firm*—Harness, Dickey & Pierce, P.L.C.

[57] ABSTRACT

The invention relates to a device for connecting to a grounding conductor the electrically conductive sheath of an electric lead laid in the slots of the inductor of a linear motor. The device is a metal shell (13), which encloses more than half the outer circumference of the lead (12) in the slot region, whose inside diameter is slightly smaller than the outside diameter of the lead (12), and which can be fastened in the respective slot (11) in a fashion lying against the inductor (10).

18 Claims, 3 Drawing Sheets

DEVICE FOR CONNECTING THE ELECTRICALLY CONDUCTING JACKET OF A LINE TO AN EARTH LEAD

BACKGROUND OF THE INVENTION

1. Field of Invention

The invention relates to a device for connecting to a grounding conductor the electrically conductive sheath of an electric lead laid in the slots of the inductor of a linear motor.

2. Description of Related Art

DE-C 30 06 382 has already disclosed a three-phase AC winding for the inductor of a linear motor, in which the leads of the individual winding phases are permanently joined together mechanically during preproduction and are then laid in the slots of the inductor. The mechanically permanent joint can be realized in this case by means of clamps which hold the leads together on the winding overhangs and simultaneously produce an electric connection between the lead sheaths and the grounding conductor which is guided along the inductor past the winding overhangs.

The task of the grounding conductor is to connect the electrically conductive sheath of the individual leads to the three-phase AC winding to earth potential in order to discharge capacitive charging currents, to detect earth faults and to permit fault localization. The aim is also to ensure protection against the risk of touching the leads.

However, it has emerged that joining the grounding conductor by means of the clamping joint described to the winding overhangs does not ensure a continuously low contact resistance in the case of long-term operation of the three-phase winding as well, because corrosion can occur at the clamping points owing to environmental influences.

BRIEF SUMMARY OF THE INVENTION

It is therefore the object of the invention to specify a device for connecting to a grounding conductor the electrically conductive sheath of an electric lead, which is largely free from corrosion and does not complicate the fitting of the lead.

The invention achieves this object by means of a metal shell, which encloses more than half the outer circumference of the lead in the slot region, whose inside diameter is slightly smaller than the outside diameter of the lead, and which can be fastened in the respective slot in a fashion lying against the inductor.

The invention renders it possible to establish electric contact via the metal shell with the lead over a relatively long section in each case by laying it in the metal shell. Since the inside diameter of the metal shell is slightly smaller than the outside diameter of the lead, a first seating of the metal shell on the outer sheath of the lead is produced, with the result that it can then be fastened, possibly together with the lead lying in it, in a slot of the inductor. The lead is held fast in the metal shell, because it is firmly enclosed by it on a circumferential section of more than 180°. This type of mounting is independent of an electric connection between the metal sheet and the grounding conductor. It is also possible to lay the lead in the metal shell after the latter has been fastened in a slot in the inductor.

The metal shell can be as long as the slot. However, it one end of the metal shell projects somewhat beyond the slot in the longitudinal direction thereof, it is possible there to produce a connection of the grounding conductor in a very simple way, it being possible to use corrosion-resistant clamping screw connections, or else welds. The latter type of connection is suitable, in particular, for a metal shell which does not project beyond the slot or also is shorter than the latter.

The metal shell can be fastened in the slot by means of screws or clamping elements. However, the metal shell is preferably resilient and has outwardly bent longitudinal edges whose width and angle of curvature are dimensioned such that when pressed into the slot they spread against the inner walls thereof. As a result, it is possible to mount the metal shell very easily together with the lead lying in it, because this unit can be pressed into the slot, the two outwardly being longitudinal edges sliding along the inner walls of the slot and being spread apart by the elasticity of the metal shell upon termination of the pressing-in operation, with the result that the metal shell is then seated automatically in the slot in a fashion incapable of rotation and displacement, and correspondingly holds the cable fast.

The inner walls of the slot can have longitudinal depressions for holding the longitudinal edges of the metal shell. This further improves the firm seating of the metal shell in the slot of the inductor, because when the metal shell is pressed into the slot the longitudinal edges latch in the longitudinal depressions thereof.

In the preceding embodiment, the seating of the metal shell in the slot of the inductor is ensured by the resilient property of the metal shell, because the latter is spread in the slot. However, it is also possible for the metal shell to be anchored in the slot without this spring property, the outer contour of the metal shell corresponding to the inner contour of the slot. In this case, the metal shell can be pushed into the slot in a well-fitting fashion from the end face of the inductor.

The slots of the inductor can be lined with a plastic material. This permits a good match between the slot contour and the contour of the metal shell. The plastic can be adjusted into the slots.

The device can also comprise a moulded component which holds the metal shell, can be inserted into the slot and can be fastened therein, and whose inner contour corresponds to the outer contour of the metal shell. Such a moulded component can be constructed, for example, as an injection-moulded plastic component which is inserted into the inductor before, or else after the metal shell is fastened. This offers the advantage that moulded components of different type can be provided for leads of different diameter and/or material, which can be inserted into similarly constructed slots of the inductor.

It is also advantageous in the case of the use of a plastic lining or of a moulded component to provide outwardly bent longitudinal edges on the metal shell which latch on internal longitudinal edges of the moulded component.

So that the moulded component is firmly seated in a fashion incapable of rotation in the slot of the inductor, it can have at least one outer longitudinal projection and/or at least one outer longitudinal depression, the inner contour of the slot corresponding to the outer contour of the moulded component. The result is to lock the moulded component and slot against a rotary movement, so that the moulded component can be pushed in its longitudinal direction into the slot when it is mounted in the inductor. A single longitudinal projection, or else a single outer longitudinal depression in the moulded component suffices to realize this type of mounting.

At at least one longitudinal end, the metal shell can be provided with a connecting element for the grounding conductor. This can be a metal connecting tab, for example, to which the grounding conductor can be, for example, welded, clamped or screwed. Since such a connecting tab does not also serve simultaneously as mounting element for the leads of the AC winding, a corrosion-resistant connection can be produced at this point.

The metal shell expediently consists of steel, preferably of stainless steel. Optimum corrosion resistance of the connection between metal shell and conducting outer sheath of the lead can also be ensured through suitable choice of material.

A plurality of metal shells, permanently connected via their connecting elements to a grounding conductor connecting them, can form a mounting unit which can be inserted into the slots of an inductor. Such a mounting unit can be produced from stainless steel metal sheet in a single punching process. It allows particularly rapid mounting of a multiplicity of metal shells in the slots of an inductor.

BRIEF DESCRIPTION OF THE DRAWINGS

An exemplary embodiment of a device according to the invention is explained in more detail below with the aid of the drawings, in which.

DETAILED DESCRIPTION OF THE INVENTION

Figure 1:
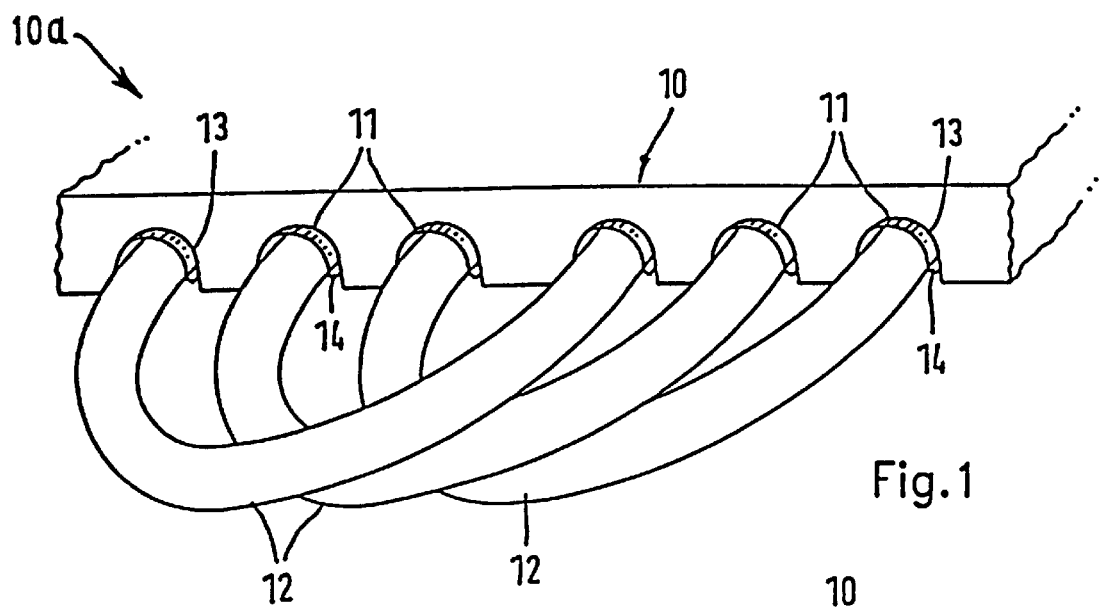
FIG. 1 shows a diagrammatic perspective representation of the inductor of a linear motor having a three-phase AC winding.

Represented in FIG. 1 is a section of the inductor 10 of a linear motor 10a in whose slots 11 the phases 12 of a three-phase AC winding lie. These phases comprise insulated electric leads having a sheath made from an electrically poorly conductive material, which can be an electrically conductive rubber mixture, for example.

The winding phases 12 are held in the slots 11 of the inductor 10 by means of metal shells 13 which in each case enclose a lead over more than half of its circumference and are firmly seated immovably in the slots 11. For this purpose, the metal shells 13 have bent longitudinal edges 14 at their longitudinal opening, and these longitudinal edges 14 are dimensioned and bent away in such a way that, after the respective metal shell 13 has been pressed in, they are spread into the slot in its cutouts and automatically can no longer fall out. Since the metal shell 13 has an inside diameter which is slightly smaller than the outside diameter of the phase 12, it is pressed lightly apart when the lead is laid in, with the result that it then already encloses the lead firmly because of its elasticity and makes a good electric connection with the conductive outer sheath of the lead. The metal shell 13 can then, for example by means of a connecting 16 which projects beyond the respective slot 11, be connected relatively easily to a grounding conductor which is guided along the inductor in the region of the metal shells 13. The connecting tab 16 can also be connected directly to earth potential.

Figure 2:
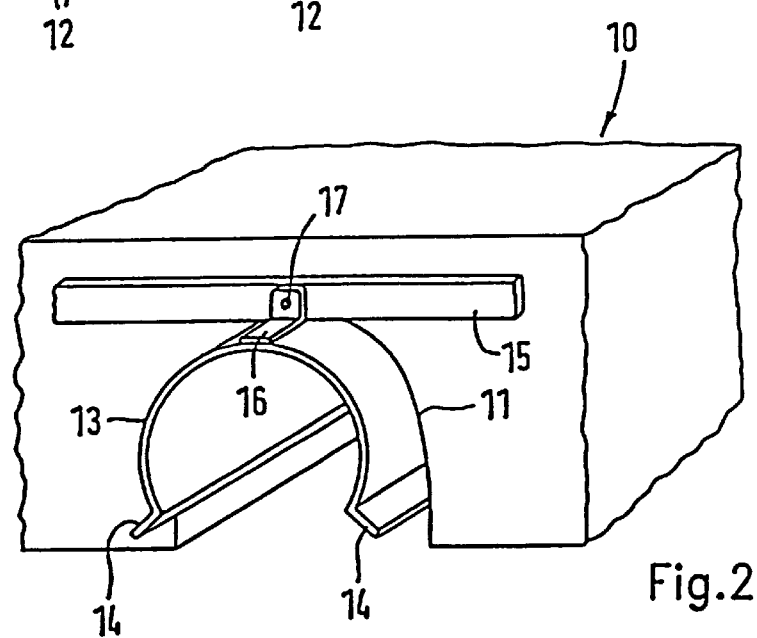
FIG. 2 shows in a perspective fashion a single slot of the inductor with a metal shell contained therein.

Such a grounding conductor 15 is represented in FIG. 2. The figure shows a part of the inductor 10 in an enlarged representation with a slot 11 into which a metal shell 13 is inserted. In this case, the two edges 14 of the metal shell 13 are spread to the inner walls of the slot 11, with the result that the metal shell 13 is firmly seated in the slot 11. The metal shell 13 projects from the slot 11 and is provided on its top side with a connecting tab 16 which, for example, can be welded to it. This connecting tab 16 is electrically connected at 17 to the grounding conductor 15, for example by being screwed or welded. If the grounding conductor 15 is fastened for its part to the inductor 10, the connection of the metal shell 13 to the grounding conductor 15 at the point 17 also provides over and above the electric connection an additional mechanical fastening of the metal shell 13 in the inductor 10.

It is, of course, also possible for the respective phase 12 to be pressed into the metal shell 13 after the latter is mounted in the inductor 10, because the elasticity of the lead allows this. Furthermore, the metal shell 13 can also be shorter than the slot 11, with the result that the connecting tab 16 is then guided into the slot 11.

Figure 3:
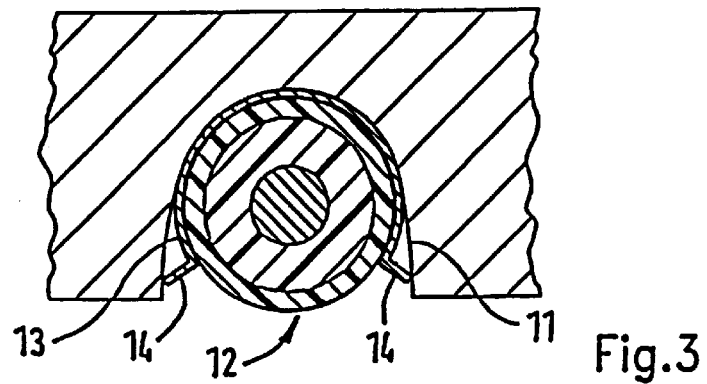
FIG. 3 shows the cross-section of the metal shell with the lead held therein in a slot of an inductor.

FIG. 3 shows the sectional representation of the arrangement shown in FIG. 2, with the phase 12 of a lead, but without the electric connection between the metal shell 13 and a grounding conductor. It is to be seen, in turn, that the metal shell 13 surrounds the phase 12 over more than half its outer circumference, and has at its opening outwardly bent longitudinal edges 14 which are firmly seated on the inner wall of the slot 11, with the result that the metal shell 13 is firmly seated in the slot 11 with the lead held in it. It is further to be seen that the metal shell 13 ensures a large-area electric connection to the outer sheath of the lead.

Figure 4:
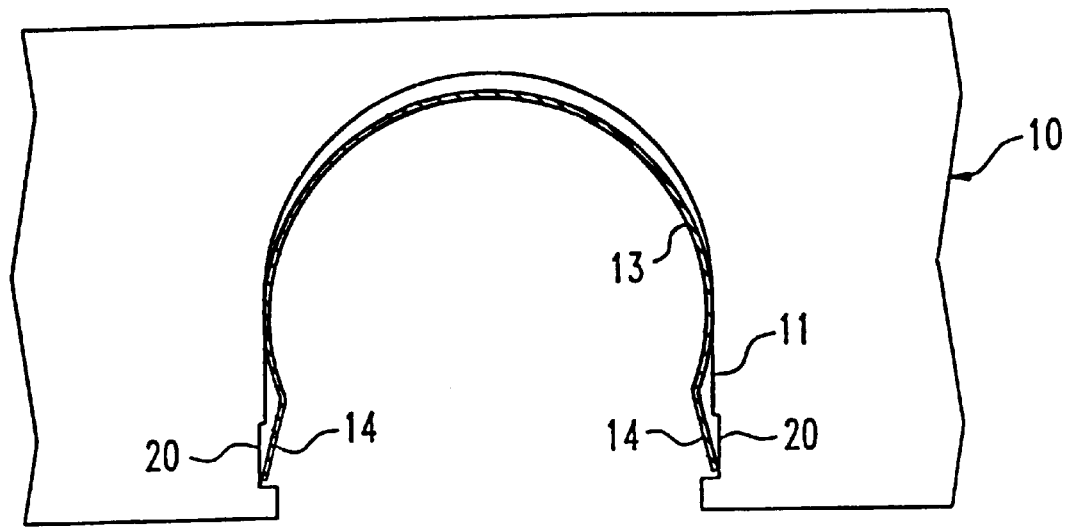
FIG. 4 shows an end view of the inductor with the metal shell in the slot of the inductor.

FIG. 4 shows two longitudinal depressions 20 on the right-hand and the left-hand inner walls of the slot 11 of the inductor 10. The metal shell 13 is latched in these longitudinal depressions 20 by means of its longitudinal edges 14. Here, as well, a lead (not shown in FIG. 4) is held by the resilience of the metal shell 13 in conjunction, possibly, with its own flexibility.

Figure 5:
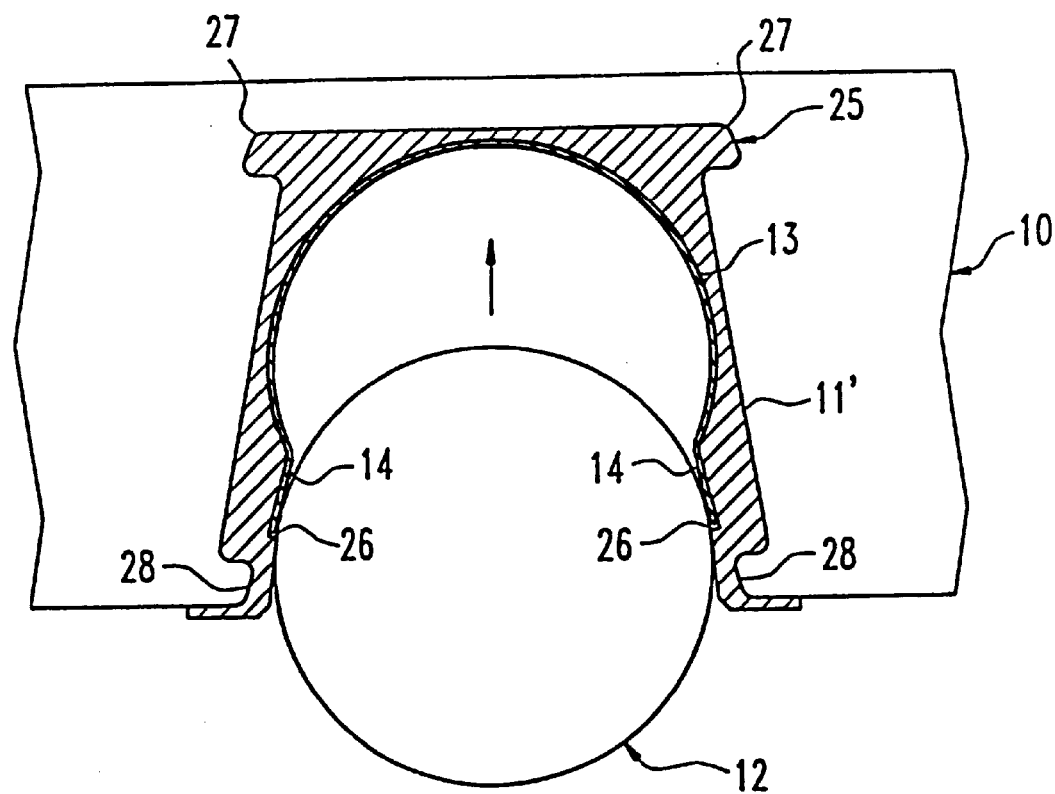
FIG. 5 shows a moulded component, inserted into an inductor, for holding the lead.

FIG. 5 shows a type of lead fastening which is based only one the flexibility of the lead material. Inserted in the slot 11' of the inductor 10 is a moulded component 25, which can be an injection-moulded plastic component, for example. It has upper longitudinal projections 27 and lower longitudinal depressions 28, which form an outer contour which is adapted to the inner contour of the slot 11', with the result that the moulded component 25 is to be pushed in its longitudinal direction into the slot 11', and is then firmly seated therein incapable of rotating.

Near its opening, the moulded component 25 has on both sides internal longitudinal edges 26 on which the outwardly bent longitudinal edges 14 of the metal shell 13 latch when the latter is inserted into the moulded component 25. It need not necessarily consist of resilient material, but this favours the firm seating of the metal shell 13 in the moulded component 25.

Also shown diagrammatically in FIG. 5 is the phase 12 of an electric lead, which is to be pressed into the moulded component 25 from below in the direction of the arrow shown, and is firmly seated therein. In this process, the flexible lead material is compressed, but can expand again when the phase 12 has adopted its final position in the metal shell 13.

It is advantageous for this purpose to provide the lead on its outside with slidable, electrically conducting coating.

Figure 6:
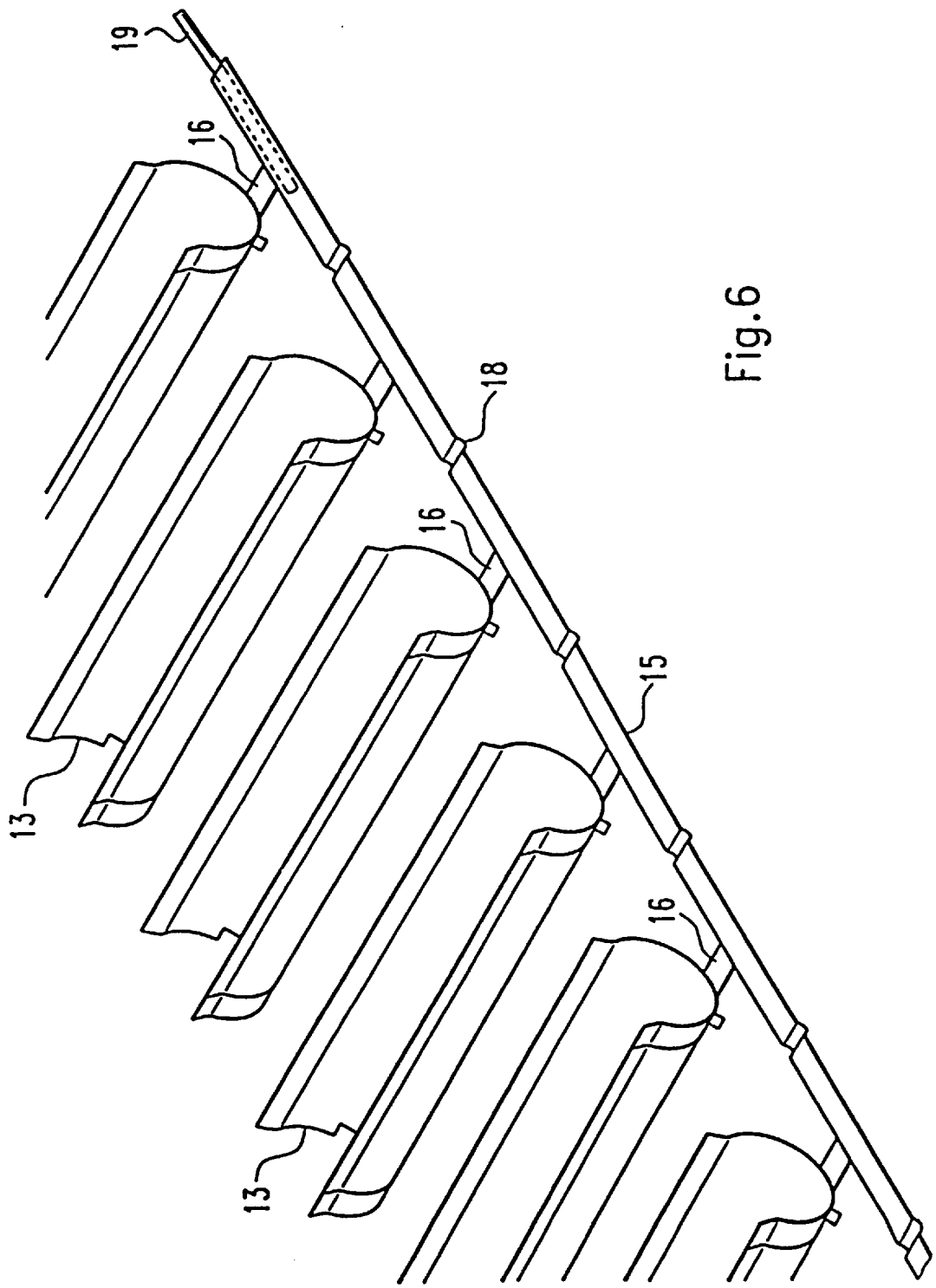
FIG. 6 shows a plurality of metal shells as a mounting unit.

FIG. 6 shows a mounting unit which comprises a plurality of metal shells 13, connecting tabs 16 provided on them, and a grounding conductor 15 connecting said tabs. The grounding conductor has offset locations 18 which serve to compensate for spacing tolerances in the slots of the inductor, and is connected to a cable 19 which is to be connected to earth potential.

What is claimed is:

1. An electrical connection device for coupling an electric lead to a structure and electrically grounding the electric lead, the electrical connection device comprising:

a body portion having an arcuate wall member formed from an electrically conductive material, the arcuate wall member being biased in an inward direction and defining a circular sector having an included angle which exceeds 180 degrees; and a fastening member coupled to a side of the arcuate wall member;

wherein the arcuate wall member is adapted to exert an inwardly directed force onto the electric lead to fixedly but releasably couple the electric lead to the body portion such that an outside surface of the electric lead is in continuous electrical contact with the arcuate wall member; and wherein the fastening member is adapted to engage the structure to fixedly couple the electrical connection device to the structure.

2. The electrical connection device of claim 1, wherein the fastening member is resiliently based in an outward direction.

3. The electrical connection device of claim 1, wherein the electrical connection device further includes a connecting member coupled to the body portion and adapted for coupling the electrical connection device to a grounding conductor.

4. The electrical connection device of claim 3, further comprising a second body portion having an arcuate wall member formed from an electrically conductive material, the arcuate wall member of the second body portion being biased in a radially inward direction and defining a circular sector having an included angle which exceeds 180 degrees, the second body portion being coupled to the connecting member.

5. The electrical connection device of claim 4, wherein the connecting member includes an offset member positioned between the body portion and the second body portion for varying a distance between a centerline of the body portion and a centerline of the second body portion.

6. The electrical connection device of claim 3, wherein the connecting member is formed from steel.

7. The electrical connection device of claim 6, wherein the connecting member is formed from stainless steel.

8. A linear motor comprising:

an electric lead having an electrically poorly conductive outer surface;

an inductor having a slot with an arcuate inner wall;

a grounding conductor coupled to the inductor; and an electrical connection device having a body portion and a fastening member, the body portion having an arcuate wall member formed from an electrically conductive material, the arcuate wall member being biased in an inward direction and defining a longitudinal opening having a width smaller than the width of the electric lead, the fastening member coupled to a side of the arcuate wall member;

wherein the arcuate wall member is deformable so that the longitudinal opening can receive the electric lead, the arcuate wall member exerting an inwardly directed force onto the electric lead to fixedly but releasably couple the electric lead to the body portion such that an outside surface of the electric lead is in continuous electrical contact with the arcuate wall member; and wherein the fastening member engages the arcuate wall member of the slot to fixedly couple the electrical connection device to the inductor.

9. The linear motor of claim 8, wherein the body portion has a length approximately equal to a length of the slot.

10. The linear motor of claim 8, wherein the fastening member includes first and second outwardly extending tabs resiliently biased in a radially outward direction and operable for engaging the arcuate wall member of the slot.

11. The linear motor of claim 10, wherein the arcuate wall member of the slot includes first and second longitudinal depressions for receiving the first and second outwardly extending tabs, respectively.

12. The linear motor of claim 8, wherein the slot is lined with a plastic material.

13. The linear motor of claim 8, wherein the electrical connection device further comprises a longitudinal member formed from a resilient material and coupled to an exterior portion of the body portion, the longitudinal member disposed at least partially within the slot and abutting at least a portion of the arcuate wall member surface.

14. The linear motor of claim 8, wherein the electrical connection device further includes a connecting member for coupling the grounding conductor to the body portion.

15. The linear motor of claim 14, wherein the connecting member is formed from steel.

16. The linear motor of claim 15, wherein the connecting member is formed from stainless steel.

17. The linear motor of claim 14, wherein the electrical connection device further includes a second body portion having an arcuate wall member formed from an electrically conductive material, the arcuate wall member of the second body portion being biased in an inward direction and defining a longitudinal opening having a width smaller than the width of a second electric lead, the arcuate wall member of the second body portion exerting an inwardly directed force onto the second electric lead to fixedly but releasably couple the second electric lead to the second body portion such that an outside surface of the second electric lead is in continuous electrical contact with the arcuate wall member of the second body portion.

18. The linear motor of claim 17, wherein the connecting member includes an offset member positioned between the body portion and the second body portion for varying a distance between a centerline of the body portion and a centerline of the second body portion.

* * * * *

UNITED STATES PATENT AND TRADEMARK OFFICE
CERTIFICATE OF CORRECTION

PATENT NO. : 6,124,550
DATED : Sep. 26, 2000
INVENTOR(S) : Peter Funken et al

It is certified that error appears in the above-identified patent and that said Letters Patent is hereby corrected as shown below:

Error(s) Noted (* = our error)

Assignee: "Felton & Guillaume Kabelwerke GmbH"
should be -- Felten & Guilleaume Kabelwerke GmbH --

Assignee: "Thyssen-Transrapid System GmbH" should be
-- Thyssen Transrapid System GmbH --.

Col. 1, line 52, "first" should be -- firm --.
Col. 1, line 62, "it" should be -- if --.
Col. 2, line 12, "being" should be -- bent --.
Col. 2, line 37, "adjusted" should be -- injected --.
Col. 3, line 60, after "connecting" insert -- tab --.
Col. 4, line 41, "one" should be -- on --.
Col. 5, line 28, "based" should be -- biased --.
Col. 5, line 53, "electrically poorly" should be -- electric poor --.
Col. 6, line 33, delete "surface".

Signed and Sealed this

Seventeenth Day of April, 2001

Attest:

NICHOLAS P. GODICI

Attesting Officer     Acting Director of the United States Patent and Trademark Office